United States Patent [19]

Berkowitz et al.

[11] Patent Number: 5,903,877
[45] Date of Patent: May 11, 1999

[54] TRANSACTION CENTER FOR PROCESSING CUSTOMER TRANSACTION REQUESTS FROM ALTERNATIVE MEDIA SOURCES

[75] Inventors: Patricia Ann Berkowitz; Robin Harris Foster, both of Little Silver; David Abraham Horovitz, Highland Park, all of N.J.; Andrew Derek Flockhart, Thornton; Myron Eugene Drapal, Longmont, both of Colo.

[73] Assignee: Lucent Technologies Inc., Murray Hill, N.J.

[21] Appl. No.: 08/723,733

[22] Filed: Sep. 30, 1996

[51] Int. Cl.[6] .............................. G06F 15/21; H04M 1/69; H04M 15/00; H04M 3/22
[52] U.S. Cl. ............................... 705/26; 705/11; 705/7; 705/9; 705/16; 364/468.15
[58] Field of Search .............................. 705/11, 7, 9, 16, 705/26; 364/468.15

[56] References Cited

U.S. PATENT DOCUMENTS

| | | | |
|---|---|---|---|
| 5,146,488 | 9/1992 | Okada et al. | 379/88 |
| 5,239,460 | 8/1993 | LaRoche | 705/11 |
| 5,444,774 | 8/1995 | Friedes | 379/266 |
| 5,479,487 | 12/1995 | Hammond | 379/67 |
| 5,511,117 | 4/1996 | Zazzera | 379/265 |
| 5,546,455 | 8/1996 | Joyce et al. | 379/265 |
| 5,642,410 | 6/1997 | Walsh et al. | 379/201 |
| 5,647,002 | 7/1997 | Brunson | 379/67 |
| 5,655,014 | 8/1997 | Walsh et al. | 379/201 |
| 5,655,015 | 8/1997 | Walsh et al. | 379/201 |
| 5,715,307 | 2/1998 | Zazzera | 379/265 |
| 5,721,770 | 2/1998 | Kohler | 379/266 |
| 5,740,238 | 4/1998 | Flockhart et al. | 379/266 X |
| 5,740,240 | 4/1998 | Jolissaint | 379/265 |
| 5,745,561 | 4/1998 | Baker et al. | 379/210 |
| 5,754,639 | 5/1998 | Flockhart et al. | 379/265 X |
| 5,760,823 | 6/1998 | Brunson et al. | 379/67 X |

OTHER PUBLICATIONS

Kerry W. Hassler, et al., Revolutionizing Definity Call Centers in the 1990s, *AT&T Technical Journal*, Jul./Aug. 1995, pp. 64–73.

*Primary Examiner*—Allen R. MacDonald
*Assistant Examiner*—Pedro R. Kanof

[57] ABSTRACT

A transaction center including a transaction processing platform having an automatic call distribution system for queuing customer transaction requests, for choosing an appropriate service agent according to information gathered about the transaction requests, and for determining when the appropriate service agent is available. Also provided is a transaction request server for receiving and storing the transaction requests. In operation, the message is first received and stored by the transaction request server. Next, the presence of the message is detected and in response thereto a signal is sent to the transaction processing platform. Finally, the message is sent to the appropriate service agent in response to a signal from the transaction processing platform indicating that the appropriate service agent is available to service the transaction request.

28 Claims, 4 Drawing Sheets

TRANSACTION CENTER FOR PROCESSING CUSTOMER TRANSACTION REQUESTS FROM ALTERNATIVE MEDIA SOURCES

FIELD OF THE INVENTION

The present invention relates to a transaction center, and more particularly, to a method and apparatus for processing customer transaction requests in the form of alternative media, such as facsimile, voice mail, electronic mail, regular mail and video, among others.

BACKGROUND OF THE INVENTION

Traditionally, business has been conducted as a store front operation where customers had to be physically present at a store to conduct business. Customers may also have been able to request items for future delivery by calling the store or by writing a letter or filling out an order form which was later mailed to the store.

In recent years, however, there has been a tremendous shift in the way business is conducted. The telephone has become the new "front door" to businesses. As the use of 800 telephone numbers proliferated, customers had an alternative and most often more convenient way to conduct business. A physical presence at the store was no longer needed, only the ability to communicate was necessary.

In response to the growth in the use of the telephone by customers, call center technology was developed. Traditional call centers consist solely of customers trying to reach service agents by telephone. The calls are placed into a queue where they wait until a service agent is available to service them. In a call center, the private branch exchange, or PBX, is provided with what is commonly known as an automatic call distribution, or ACD, system. ACD systems are well known in the art and generally comprise customer administrable software that governs what happens to a call between arrival at the call center and the time the call is answered and processed by a service agent. The ACD system may, for instance, allow the caller to hear ringing, music or announcements about the company while waiting in the queue. In addition, the ACD system may perform functions of which the caller is not aware. These functions include using information gathered about the caller to access caller records or invoices which will later be used by the service agent, and routing the call to an appropriate available agent based on a variety of factors relating to the customer request or the service agents. Such factors include, for example, the geographical origin of the call indicated by the telephone number from which the call came, whether the call is a sales or service call, whether there should be a priority assigned to the call based on the caller, the type of skills necessary to properly service the request and the relative workloads of the service agents which may include when a particular agent is available to handle a call. The information may also include information such as the number that the customer called in order to obtain service, as in the case where a business uses separate numbers for sales and service. This information may be gathered in a variety of ways. For example, the caller may be prompted to enter information such as an account number, social security number or zip code, or may be prompted to choose from a menu of options. Also, some information is inherent in each call, such as the area code of the origin of the call, and can be gathered without the knowledge of the caller. Typically, the type of information used to route the calls is selectable and programmable by the organization utilizing the call center and the calls are ultimately routed based upon a set of programmable rules which utilize the information.

In addition, the PBX is typically provided with monitoring and reporting software that is able to monitor and report quantitative metrics relating to the customer requests, the individual service agents and the call center as a whole. An example of such software is Lucent Technologies, Inc.'s Call Management System, or CMS, and Basic Call Management System, or BCMS, software. For instance, this software can provide quantitative metrics relating to real time information such as the number of calls currently waiting in the call center queue and how long each call has been waiting. Also, the software can provide quantitative metrics relating to statistical information, such as the number of calls handled by the call center in a given day and the average process time of each call, and historical information, such as the volume of calls handled in a given day in a given year. Furthermore, quantitative metrics relating to the performance of individual service agents, such as the number of calls handled in a day and the average process time of each, can be gathered and reported. These exemplary quantitative metrics are provided for illustrative purposes only, and it should be understood that a large variety of other quantitative metrics could be measured as desired by a particular user.

Keeping up with the rising volume of calls can be costly and inefficient. Thus, in order to provide quality service in a cost effective manner, businesses developed alternative routes for customers to communicate their requests. Voice mail technology was provided to callers as an alternative to waiting in the queue for an available service agent. With the voice mail option, a caller can leave a message stating his or her request which is processed and serviced by a service agent at a later time. Other alternatives include media such as the facsimile, electronic mail via subscriber networks and the Internet, regular mail, such as a letter or a purchase order, video, and live multi-media requests from sources such as the Internet. Also, in some situations, the customer does not make the request at all, but instead their equipment does, as is the case with burglar or fire alarms. The requests can also originate from within the business operating the call center, as in the case where automatic subscription renewals are to be generated and sent to customers.

These alternatives provide the benefit of reducing the number of direct telephone calls that a business, and its service agents, must handle. Another benefit is that a customer is not forced to wait on the telephone in a queue in real time. Instead, the customer has left a proxy, in the form of a facsimile, a voice mail, a letter, an electronic mail message or video message, which is awaiting service. These alternatives, however, also have a price. Fragmenting customer service among these many media may result in an inability to monitor and report the performance of the call center for some or all of the media. Therefore, the business is unable to obtain a total picture of service quality. Also, when service requests come in by facsimile, regular mail, electronic mail, and the like, they are typically kept in a central location where they are either picked up by the service agents or manually distributed to the service agents. Thus, because humans are involved in the process of getting these types of service requests to the service agents, the more difficult request may be passed over or put aside. Also, often times these types of service requests are handled during service agent off-time, rather than on a first come, first serve basis. Accordingly, the true time it takes to handle these requests cannot be accurately tracked. Finally, it takes time for the request to get to the service agents in this manner and, in the meantime, customers may get tired of waiting and call in anyway.

SUMMARY OF THE INVENTION

A preferred transaction center according to the present invention includes a transaction processing platform provided with an automatic call distribution system for queuing transaction requests, for choosing an appropriate service agent according to information gathered about the transaction requests, and for determining when the appropriate service agent is available. Also provided are a transaction request server for receiving and storing the transaction requests, means for detecting the presence of the transaction requests, means responsive to a signal from the detecting means for indicating to the transaction processing platform that the transaction requests have been received, and means for sending the transaction request to the appropriate service agent in response to a signal from the transaction processing platform.

In operation, the message is first received and stored by the transaction request server. Next, the presence of the message is detected and in response thereto a signal is sent to the transaction processing platform. Finally, the transaction request is sent to the appropriate service agent in response to a signal from the transaction processing platform indicating that the appropriate service agent is available to service the transaction request.

DETAILED DESCRIPTION OF THE PREFERRED EMBODIMENTS

Figure 1:
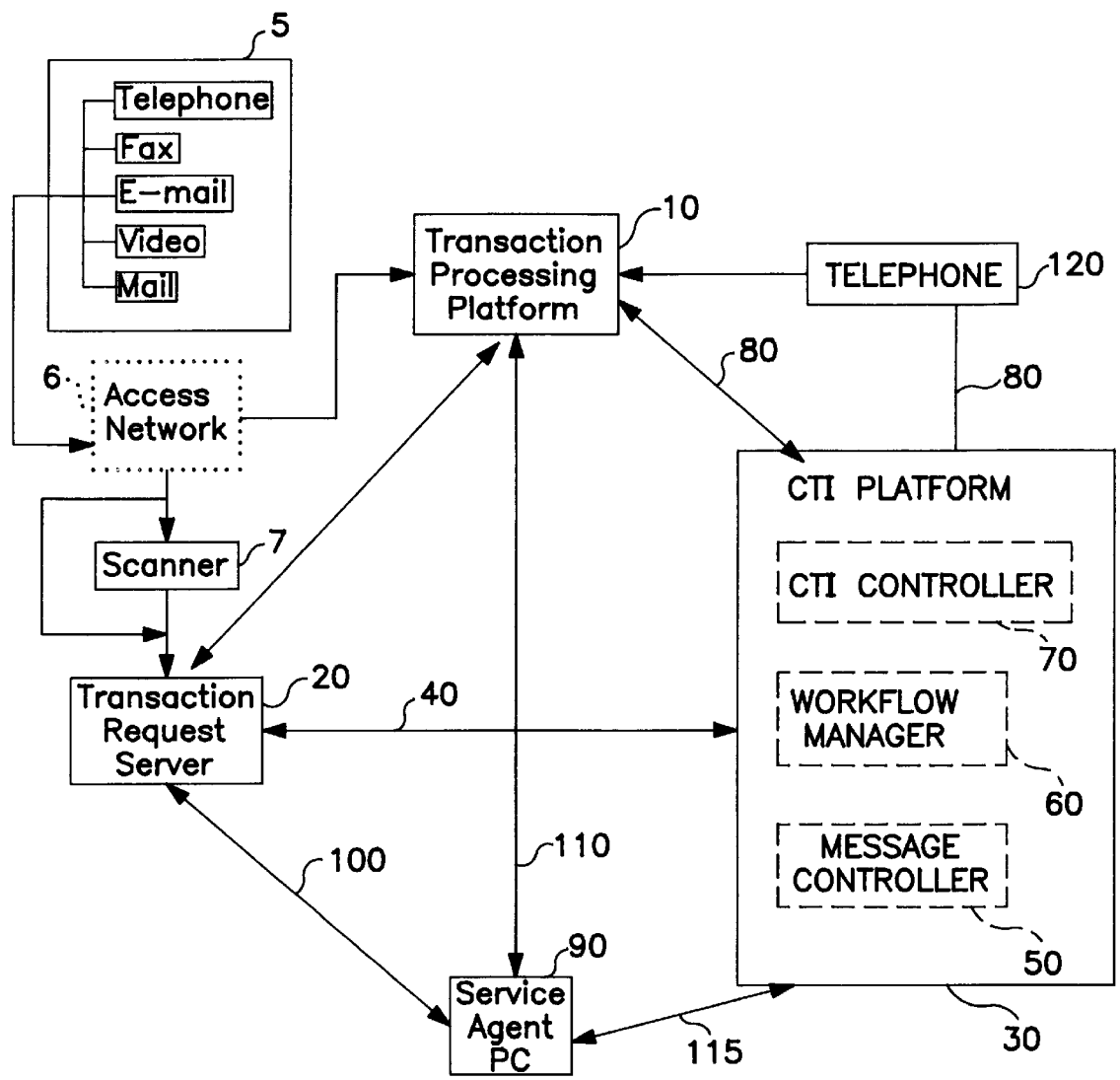
FIG. 1 is a block diagram of a transaction center according to a preferred embodiment of the present invention.

Referring to FIG. 1, a block diagram of a transaction center according to a preferred embodiment of the present invention is shown. A transaction processing platform 10 is provided with an ACD system and monitoring and reporting software as described above. In a preferred embodiment of the present invention, transaction processing platform 10 is a PBX, such as Lucent Technologies, Inc.'s DEFINITY private branch exchange. It should be apparent to one of skill in the art, however, that transaction processing platform 10 can take on many other forms, such as a PC platform or the like, as long as it has the ability to be loaded with and run the ACD system and the monitoring and reporting software as described. Thus, as described above, transaction processing platform 10 is able to receive customer transaction requests, place the transaction requests in a service queue, and eventually route the customer transaction requests to an appropriate available service agent for processing. Also as described above, transaction processing platform 10 is able to monitor and report the performance of the individual service agents and the transaction center as a whole.

Also provided is a transaction request server 20, which is capable of receiving and storing customer transaction requests from customer 5 that need to be processed by a service agent. The customer transaction requests may be in the form of a facsimile, voice mail, electronic mail via the Internet or some other subscriber network supported by transaction request server 20, regular mail or video, or any combination thereof. The customer transaction requests are routed to the transaction center through what is generally described herein as access network 6, which may be, for example, a public telephone switching network, the Internet, the U.S. mail system, or any combination thereof. As shown in FIG. 1, the transaction request may go directly to transaction request server 20 or may be routed through transaction processing platform 10 depending upon the particular implementation. The customer requests received and stored by transaction request server 20 must be in electronic format. Thus, in the case of a customer request in the form of regular mail, the customer request must be converted into an electronic form by scanner 7 prior to being stored by transaction request server 20. Transaction request server 20 may be, for example, a multi-media messaging platform such as Lucent Technologies, Inc.'s INTUITY AUDIX system, or any other device that is capable of receiving and storing transaction requests in any of the forms described herein.

The business that is operating and administering the transaction center has access to transaction processing platform 10 and transaction request server 20 in order to select, program and administer the various functions described herein.

In addition, the transaction center shown in FIG. 1 is provided with computer telephone integration, or CTI, software which is well known in the art. As shown in FIG. 1, the CTI software is preferably stored on a separate PC platform 30, but may also be stored on transaction processing platform 10 or on transaction request server 20. In a preferred embodiment, the CTI software comprises three software modules, the operation of which will be described in detail below. The three software modules are a message controller 50, a workflow manager 60 and a CTI controller 70. Transaction request server 20 interfaces with PC platform 30 through application programming interface, or API, 40. Similarly, transaction processing platform 10 interfaces with PC platform 30 through CTI link 80.

Although only one transaction processing platform 10 and only one transaction request server 20 are shown in FIG. 1, it should be understood that this is only for illustrative purposes and that more than one transaction processing platform 10 and/or transaction request server 20 may be utilized according to the present invention in connection with the CTI Software described above. In other words, the CTI software, and specifically the methods described herein, can be used to support multiple transaction processing platforms and multiple transaction request servers.

Each of a plurality of service agents 90 preferably has a personal computer, or PC, which is provided with desktop software which enables the service agent to receive and/or view each customer request whether it be in facsimile, electronic mail, voice mail, regular mail or video format. In the case of voice mail messages, the customer request can be played back to the service agent either over speakers contained in PC 90 if PC 90 has a sound card, or over the service agent's telephone connection.

In addition, the desktop software provides the service agent with tools with which the agent can monitor the status of a customer request in the queue and the progress of the processing of the request. Using these tools, the service agent is also able to monitor and search all transaction requests that are currently waiting in the queue and those that have already been serviced. Thus, if a customer who has previously sent a transaction request in a form such as a facsimile, electronic mail or the like later actually calls in to check on the status of the request, any service agent can retrieve the queued transaction request and service the customer. Also, as described above, the ACD system of transaction processing platform 10, using information gathered about the customer, is able to access information such as customer records and invoices for use by the service agent handling a particular customer request. In an alternative embodiment of the present invention, the ACD system provides the information gathered about the customer to an auxiliary software application which accesses the additional information and provides it to transaction processing platform 10. This auxiliary application may be loaded directly on transaction processing platform 10 or on an auxiliary server attached to transaction processing platform 10. In order to facilitate this function, the desktop software has what is commonly known in the art as a "screen pop" capability which presents the customer information to the service agent on the screen of the service agent's PC 90 just prior to the time that the agent receives the customer request in the manner to be described below.

Figure 2:
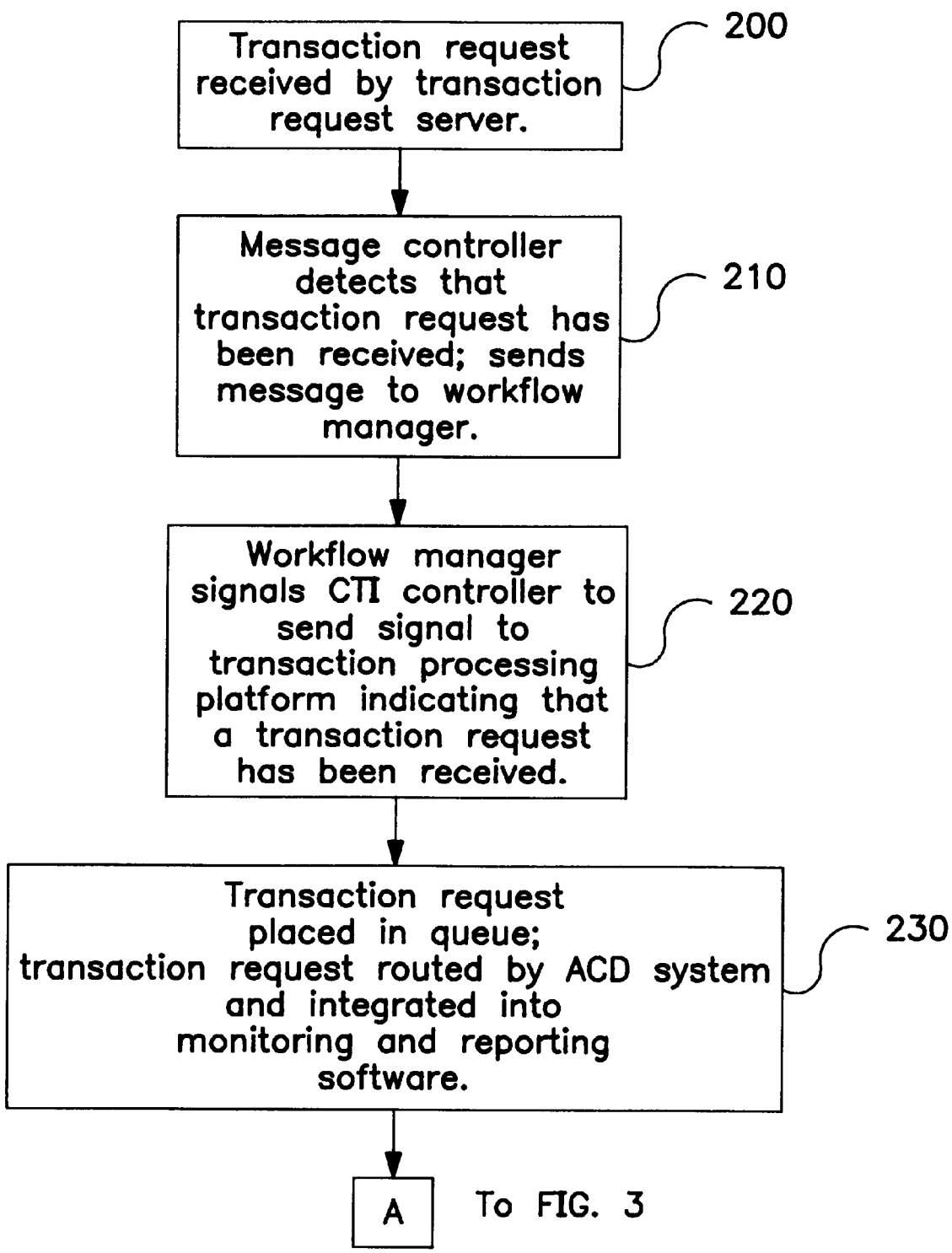
FIGS. 2–4 are flow diagrams illustrating the operation of the transaction center of FIG. 1.
Figure 3:
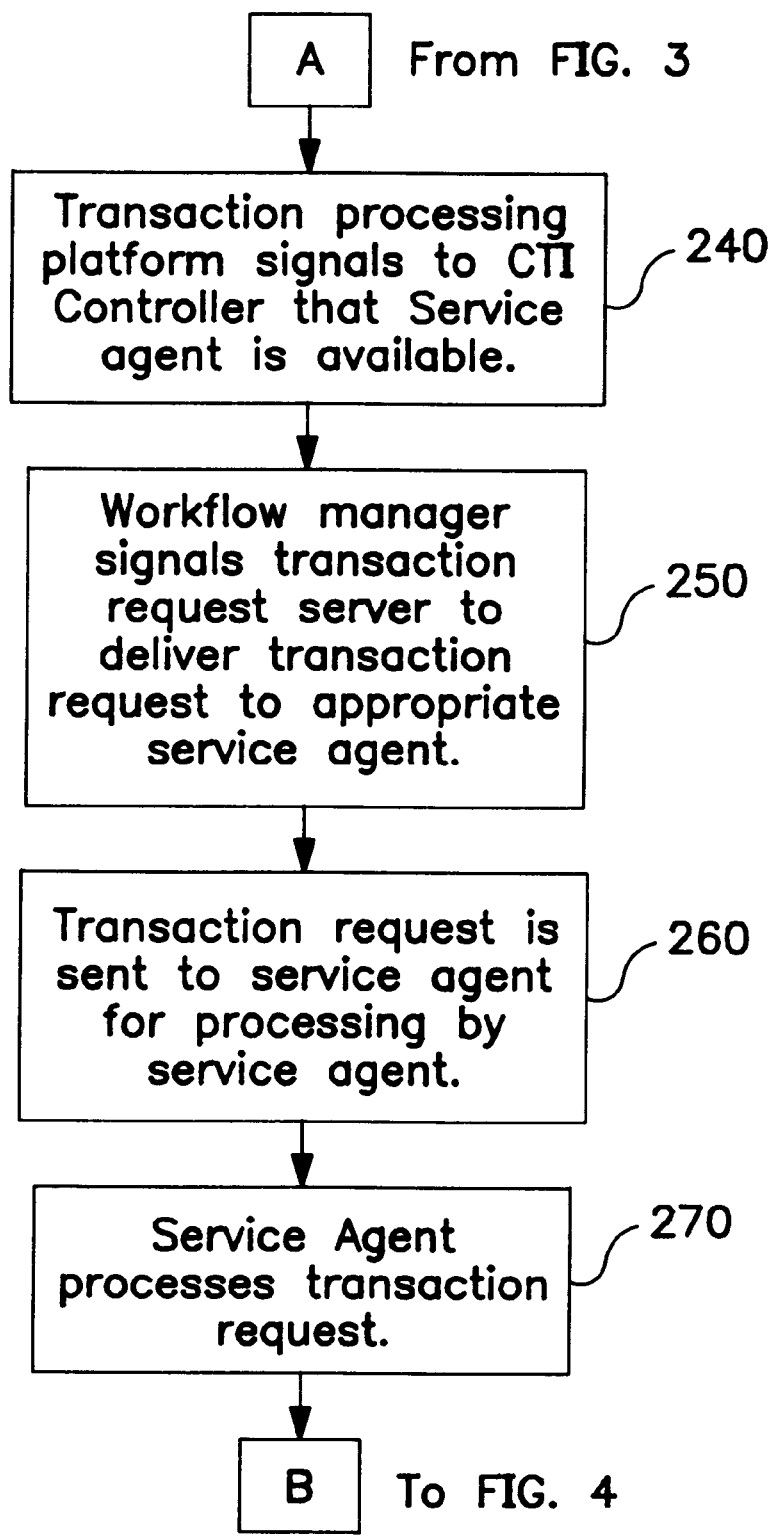
Figure 4:
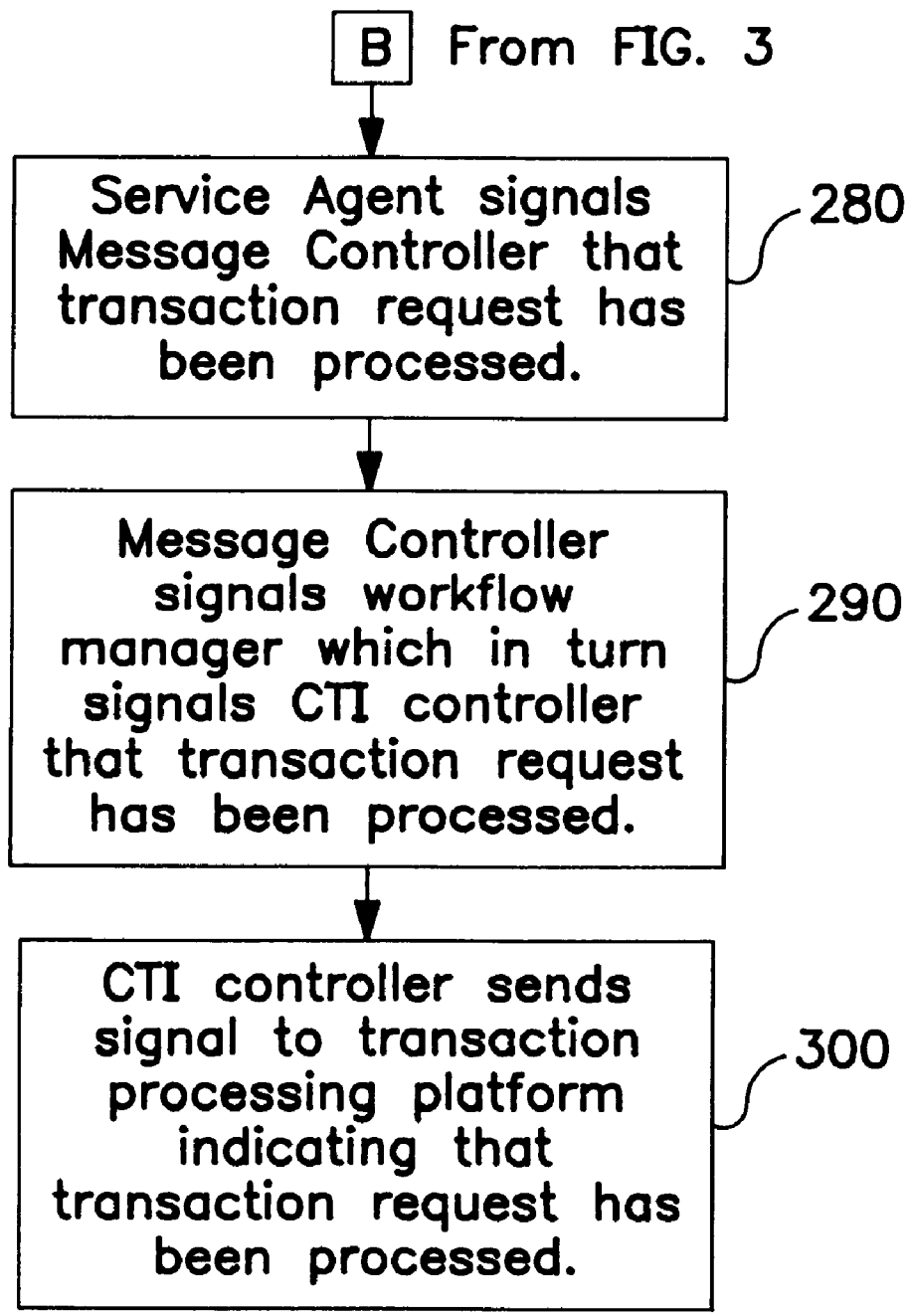

Referring now to FIG. 2–4, the operation of the transaction center shown in FIG. 1 will be described in detail. As shown in block 200, a transaction request is received by transaction request server 20 from customer 5. As discussed above, this transaction request can be in the form of a facsimile, a voice mail message, an electronic mail message, a piece of regular mail scanned into electronic format or a video message, or any combination thereof. In addition, the transaction request may be a live multi-media request from a source such as the Internet or some other type of electronic record indicating the presence of a transaction request that needs to be serviced. Also, note that in the preferred embodiment of the present invention where transaction processing platform is a PBX, a customer transaction request in the form of a live telephone call can go directly to transaction processing platform 10 where it is handled by a service agent as a live call, or can end up being stored in transaction request server 20 as a voice mail message. Next, as shown in block 210, message controller 50 detects that a transaction request has been received by transaction request server 20 and sends a signal to workflow manager 60 indicating the same. Workflow manager 60 then sends a signal to CTI controller 70 instructing it to send a signal to transaction processing platform 10 indicating that a customer transaction request has been received, as shown in box 220. This signal to transaction processing platform 10 may be in the form of an actual telephone call made by any one of a plurality of actual telephones 120 connected to PC platform 30 or preferably by simply sending an electronic message directly from PC platform 30 over API 80. The transaction request is then placed in the service queue by transaction processing platform 10, as shown in block 230. Because the transaction request is in the queue in transaction processing platform 10, it can be routed by the ACD system provided in transaction processing platform 10 and can be placed into the monitoring system provided by the monitoring and reporting software contained in transaction processing platform 10. CTI controller 70 preferably provides information gathered about the transaction request as described above to transaction processing platform 10 at the time the signal corresponding to the transaction request is sent to transaction processing platform 10 in order to facilitate processing by the ACD system and the monitoring and reporting software. When the ACD system of transaction processing platform 10 determines that an appropriate service agent is available, a signal is sent to CTI controller 70, as shown in box 240. As shown in boxes 250 and 260, in response to a signal sent from workflow manager 60, transaction request server 20 delivers the transaction request to an appropriate service agent, and preferably to that service agent's PC 90. The service agent then processes the transaction request and signals the message controller, preferably through his or her PC 90, when finished, as shown in boxes 270 and 280. As shown in box 290, the message controller 50 then sends a signal to workflow manager 60 indicating the completion of the processing of the transaction request, which in turn signals same to CTI controller 70. Finally, as shown in box 300, CTI controller 70 sends a signal to transaction processing platform 10 indicating that the transaction request has been processed either by disconnecting the call made by the appropriate telephone 120 or preferably by sending an electronic message to transaction processing platform 10. By this last operation, transaction processing platform 10, and specifically the software contained in transaction processing platform 10, knows that the customer request has been successfully processed. Part of the processing may include the case where the service agent returns the transaction request to the transaction request server 20 to then be rerouted to another service agent for processing, as may be necessary when, for example, the original service agent lacks the skills to service the transaction request or is too busy.

Thus, the present invention provides a transaction center in which customer transaction requests in the form of a facsimile, a voice mail message, an electronic mail message and regular mail can be integrated into the ACD and monitoring and reporting systems of the transaction processing platform. In such a configuration, all customer transaction requests regardless of form are routed in an appropriate and timely manner. Furthermore, the business is able to obtain a total picture of the quality of the service provided by its service agents.

While presently preferred embodiments of the invention have been disclosed, it is to be understood that the invention is not limited thereto, but that many modifications will be apparent to those of skill in this art.

What is claimed is:

1. A transaction center having a plurality of service agents for automatically servicing a plurality of transaction requests including transaction requests placed by proxy, the transaction center comprising:

(a) a transaction processing platform, said transaction processing platform having an automatic transaction distribution system for queuing said transaction requests, for choosing one of said plurality of service agents according to information gathered about said transaction requests, and for determining when said one of said plurality of service agents is available;

(b) a transaction request server for receiving and storing one of said transaction requests placed by proxy;

(c) means for detecting a presence of said one of said transaction requests;

(d) means responsive to a signal from said detecting means for indicating to said transaction processing platform that said one of said transaction requests has been received by said transaction request server; and (e) means for sending said one of said transaction requests to said one of said plurality of service agents in response to a signal from said transaction processing platform indicating that said one of said plurality of service agents is available.

2. A transaction center according to claim 1, further comprising means for indicating to said transaction processing platform that said one of said plurality of service agents has completed said servicing of said one of said transaction requests.

3. A transaction center according to claim 1, wherein said transaction processing platform is a private branch exchange.

4. A transaction center according to claim 1, wherein said transaction request server is a multi-media messaging platform.

5. A transaction center according to claim 1, wherein said information gathered about said transaction requests is selectable and programmable.

6. A transaction center according to claim 1, wherein said information gathered about said transaction requests relates to a characteristic which aids in servicing said transaction requests.

7. A transaction center according to claim 1, wherein choosing one of said plurality of service agents is based upon programmed rules utilizing said information gathered about said transaction requests and information relating to said service agents.

8. A transaction center according to claim 1, further comprising means for measuring quantitative metrics relating to said service agents.

9. A transaction center according to claim 8, further comprising means for reporting said quantitative metrics.

10. A transaction center according to claim 1, further comprising means for measuring quantitative metrics relating to said servicing of said transaction requests.

11. A transaction center according to claim 10, further comprising means for reporting said quantitative metrics.

12. A transaction center having a plurality of service agents for automatically servicing a plurality of transaction requests including transaction requests placed by proxy, comprising:
   (a) means for queuing said transaction requests and for choosing one of said plurality of service agents according to information gathered about said transaction requests;
   (b) means for determining when said one of said plurality of service agents is available;
   (c) means for receiving and storing one of said transaction requests placed by proxy;
   (d) means for detecting the presence of said one of said transaction requests;
   (e) means responsive to a signal from said detecting means for indicating to said queuing and choosing means that said one of said transaction requests has been received by said receiving and storing means; and
   (f) means for sending said message to said one of said plurality of service agents in response to a signal from said determining means indicating that said one of said plurality of service agents is available.

13. A transaction center according to claim 12, wherein said information gathered about said transaction requests is selectable and programmable.

14. A transaction center according to claim 12, wherein said information gathered about said transaction requests relates to a characteristic which aids in said servicing of said transaction requests.

15. A transaction center according to claim 12, wherein said choosing is based upon programmed rules utilizing said information gathered about said transaction requests and information relating to said service agents.

16. A transaction center according to claim 12, wherein said queuing and choosing means and said determining means comprise a private branch exchange having an automatic call distribution system.

17. A transaction center according to claim 12, wherein said receiving and storing means is a multi-media messaging platform.

18. A transaction center according to claim 12, further comprising means for measuring quantitative metrics relating to said service agents.

19. A transaction center according to claim 18, further comprising means for reporting said quantitative metrics.

20. A transaction center according to claim 12, further comprising means for measuring quantitative metrics relating to said servicing of said transaction requests.

21. A transaction center according to claim 20, further comprising means for reporting said quantitative metrics.

22. A method of integrating a transaction request placed by proxy into a transaction center having a plurality of service agents for servicing a plurality of transaction requests, said transaction center having an automatic transaction distribution system for queuing said transaction requests, for choosing one of said plurality of service agents according to information gathered about said transaction requests, and for determining when said one of said plurality of service agents is available, said method comprising the steps of:
   (a) receiving and storing said transaction request placed by proxy;
   (b) detecting the presence of said transaction request;
   (c) indicating to said automatic call distribution system that said transaction request has been received; and
   (d) sending said transaction request to said one of said plurality of service agents in response to a signal from said automatic call distribution system indicating that said one of said plurality of service agents is available.

23. A method a according to claim 22, further comprising the step of indicating to said automatic call distribution system that said transaction request has been serviced.

24. A method according to claim 22, wherein said information gathered about said transaction request is selectable and programmable.

25. A method according to claim 22, further comprising the step of measuring quantitative metrics relating to said service agents.

26. A method according to claim 25, further comprising the step of reporting said quantitative metrics.

27. A method according to claim 22, further comprising the step of measuring quantitative metrics relating to said servicing of said transaction requests.

28. A method according to claim 27, further comprising the step of reporting said quantitative metrics.

* * * * *